US010758013B2

(12) United States Patent
Gooch et al.

(10) Patent No.: US 10,758,013 B2
(45) Date of Patent: *Sep. 1, 2020

(54) METHODS AND APPARATUSES FOR MAKING CUSTOM ORTHOTICS, INSOLES AND OTHER FOOTWEAR INSERTS (71) Applicant: Superfeet Worldwide, Inc., Ferndale, WA (US)

(72) Inventors: Matthew Warren Gooch, Ferndale, WA (US); Brent McCoy, Bellingham, WA (US); Dan Wakeland, Bellingham, WA (US)

(73) Assignee: SUPERFEET WORLDWIDE, INC., Ferndale, WA (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/141,790

(22) Filed: Sep. 25, 2018

(65) Prior Publication Data
US 2019/0021449 A1 Jan. 24, 2019

Related U.S. Application Data (63) Continuation of application No. 14/485,552, filed on Sep. 12, 2014, now Pat. No. 10,136,703.

(51) Int. Cl.
*A43D 1/02* (2006.01)
*A43B 17/00* (2006.01)
(Continued)

(52) U.S. Cl.
CPC .............. *A43D 1/022* (2013.01); *A43B 17/00* (2013.01); *A43B 17/14* (2013.01); *A43D 8/00* (2013.01)

(58) Field of Classification Search
CPC . A43D 1/00; A43D 1/02; A43D 1/022; A43B 7/28
See application file for complete search history.

(56) References Cited

U.S. PATENT DOCUMENTS 964,119 A * 7/1910 Norton
1,044,171 A 11/1912 Guilford
(Continued)

FOREIGN PATENT DOCUMENTS

EP 0276580 A2 8/1988
JP 63-249501 A 10/1988
(Continued)

OTHER PUBLICATIONS

Office Action dated Jul. 4, 2018 for co-pending Chinese Patent Application No. 201580058978.6; 21 pages with English translation.

(Continued)

*Primary Examiner* — Megan E Lynch
(74) *Attorney, Agent, or Firm* — Lowe Graham Jones PLLC (57) ABSTRACT An apparatus to assist in making an orthotic, insole or other footwear insert that is customized to a plantar surface of an individual's foot is provided. The apparatus includes a portable housing; a heater unit to selectively heat the orthotic or a heel cap of the footwear insert to increase its pliability; at least one alignment device to assist in positioning and orientating the individual's foot prior to conforming the orthotic or the heel cap to the plantar surface of the individual's foot; and a vacuum system to selectively apply a vacuum around the individual's foot to bring the orthotic or the heel cap into conformance with the plantar surface of the individual's foot prior to setting of the orthotic or the heel cap. Related methods of making custom orthotics, insoles and other footwear inserts are also provided.

19 Claims, 7 Drawing Sheets (51) Int. Cl.
*A43B 17/14* (2006.01)
*A43D 8/00* (2006.01)

(56) References Cited

U.S. PATENT DOCUMENTS

| | | | | |
|---|---|---|---|---|
| 2,010,407 | A | | 8/1935 | Eugen |
| 3,579,837 | A | * | 5/1971 | Soriano .................. A43D 1/02 33/3 B |
| 3,995,002 | A | | 11/1976 | Brown |
| 4,139,337 | A | * | 2/1979 | David .................... A43D 1/02 425/119 |
| 4,454,618 | A | * | 6/1984 | Curchod ................ A43D 1/022 12/1 R |
| 4,510,636 | A | * | 4/1985 | Phillips .................. A43D 1/00 12/1 R |
| 4,521,171 | A | * | 6/1985 | Noonan, Jr. ............ A43B 7/28 425/2 |
| 4,662,079 | A | * | 5/1987 | Graf ...................... A43B 7/28 33/3 R |
| 4,669,142 | A | * | 6/1987 | Meyer .................... A43B 7/28 12/142 N |
| 4,716,662 | A | * | 1/1988 | Bar ........................ A43B 7/28 12/146 B |
| 4,718,179 | A | | 1/1988 | Brown |
| 4,932,852 | A | * | 6/1990 | Suzuki ................... A43D 1/022 249/55 |
| 4,962,593 | A | * | 10/1990 | Brown .................... A43B 7/141 36/173 |
| 4,964,229 | A | * | 10/1990 | Laberge ................ A43B 5/1666 36/93 |
| 5,027,461 | A | * | 7/1991 | Cumberland ............ A43B 7/28 12/142 N |
| 5,275,775 | A | * | 1/1994 | Riecken .................. A61F 5/14 12/142 N |
| 5,282,328 | A | * | 2/1994 | Peterson ................ A43D 1/022 36/140 |
| 5,387,384 | A | * | 2/1995 | Irving .................... A43B 7/28 249/155 |
| 5,632,057 | A | * | 5/1997 | Lyden .................. A43B 3/0063 12/146 B |
| 5,689,446 | A | | 11/1997 | Sundman et al. |
| 5,790,256 | A | * | 8/1998 | Brown .................... A43D 1/02 33/3 R |
| 5,843,483 | A | | 12/1998 | Theriault et al. |
| 5,879,605 | A | * | 3/1999 | David .................... A43B 7/28 264/101 |
| 5,891,545 | A | * | 4/1999 | Delude ................ A43B 17/006 36/154 |
| 5,928,673 | A | * | 7/1999 | Ryan .................... A43D 1/022 264/223 |
| 6,741,728 | B1 | * | 5/2004 | Genest .................. A43D 1/02 382/115 |
| 6,908,444 | B2 | * | 6/2005 | Lindh .................. A61F 5/05825 264/222 |
| 8,567,081 | B2 | * | 10/2013 | Smith .................... A61B 5/0082 33/515 |
| 2002/0138923 | A1 | * | 10/2002 | Shaffeeullah .......... A43D 1/025 12/142 N |
| 2002/0144363 | A1 | * | 10/2002 | Royall .................. B29D 35/122 12/142 N |
| 2004/0134104 | A1 | * | 7/2004 | Shor ........................ A61F 5/14 36/88 |
| 2006/0015050 | A1 | * | 1/2006 | Bleau .................... A43B 7/141 602/28 |
| 2006/0076700 | A1 | * | 4/2006 | Phillips .................. A43B 17/00 264/40.1 |
| 2006/0076706 | A1 | * | 4/2006 | Buethorn ................ A43B 7/28 264/223 |
| 2006/0247892 | A1 | * | 11/2006 | Peterson ................ A43D 1/025 702/167 |
| 2007/0163147 | A1 | * | 7/2007 | Cavanagh ............ A61B 5/6807 36/44 |
| 2008/0010856 | A1 | * | 1/2008 | Hakkala .................... A61F 5/14 36/43 |
| 2008/0016715 | A1 | * | 1/2008 | Vickroy .................. A43B 7/28 36/2.6 |
| 2009/0071038 | A1 | * | 3/2009 | Luthi .................. A43B 17/023 36/91 |
| 2009/0183388 | A1 | * | 7/2009 | Miller .................... G06F 30/00 36/43 |
| 2009/0273109 | A1 | * | 11/2009 | Johnson ................ B29D 35/128 264/40.5 |
| 2012/0053490 | A1 | * | 3/2012 | Smith .................. A61B 5/0082 600/592 |
| 2012/0198949 | A1 | * | 8/2012 | Xia ........................ A43D 1/02 73/865.8 |
| 2013/0114869 | A1 | * | 5/2013 | Hernandez Stark ........ A61B 5/1074 382/128 |
| 2013/0174445 | A1 | * | 7/2013 | Hakkala ................ A43D 1/022 36/43 |
| 2013/0263470 | A1 | * | 10/2013 | Durocher ............... A43B 17/14 36/43 |
| 2014/0055590 | A1 | * | 2/2014 | Smith .................. A61B 5/0082 348/77 |

FOREIGN PATENT DOCUMENTS

| | | |
|---|---|---|
| JP | 10506334 A | 6/1998 |
| JP | 2013-537809 A | 10/2013 |
| WO | 2012030373 A1 | 3/2012 |

OTHER PUBLICATIONS

Office Action dated Apr. 2, 2019 for co-pending Chinese Patent Application No. 201580058978.6; 14 pages with English translation.

Office Action From Corresponding PCT Application PCT/US15/47981; dated Aug. 5, 2016; 16 Pages.

Office Action dated Sep. 30, 2019 for co-pending Chinese Patent Application No. 201580058978.6; 15 pages with English translation.

Office Action dated Oct. 1, 2019 for co-pending Japanese Patent Application No. 2017-513754; 16 pages with English translation.

* cited by examiner

METHODS AND APPARATUSES FOR MAKING CUSTOM ORTHOTICS, INSOLES AND OTHER FOOTWEAR INSERTS

PRIORITY CLAIM

This patent application is a continuation of U.S. patent application Ser. No. 14/485,552, entitled "METHODS AND APPARATUSES FOR MAKING ORTHOTICS, INSOLES AND OTHER FOOTWEAR INSERTS," filed on Sep. 12, 2014, the entirety of which is hereby incorporated by reference.

TECHNICAL FIELD

This disclosure generally relates to orthotics, insoles and other inserts for footwear, more particularly, to methods and apparatuses for making custom orthotics, insoles and other inserts for footwear.

DESCRIPTION OF THE RELATED ART

Orthotics, insoles and other inserts for footwear can vary widely in form and may consist of or include a substantially rigid member desirably having a relatively thin thickness and extending from the calcaneus area of the foot (the heel portion) to behind the metatarsal head area of the foot (i.e. an area at the "ball" of the foot) and being formed in conformance with the planter surface of an individual's foot. In general, the purpose of the substantially rigid member (sometimes called an orthotic, functional orthotic or heel cap) is to position, and then to control the movements of, the midtarsal and subtalar joints during the gait cycle which the body goes through in walking and running, and also possibly for other movements. Details of the gait cycle and the general intended function of the aforementioned orthotics or heel caps, as well as other information relevant to aspects of the present invention, are set forth in U.S. Pat. No. 5,394,626, entitled "Orthotic and Method of Making the Same," and example methods of making custom orthotics and insoles are disclosed and described in U.S. Pat. Nos. 3,995,002; 4,597,196; 4,718,179; 4,803,747; 4,962,593; 5,184,409, and 5,394,626, all of which are incorporated herein by reference in their entireties.

BRIEF SUMMARY

The methods and apparatuses for making custom orthotics, insoles and other footwear inserts shown and described herein provide methods and apparatuses that are well suited to make custom orthotics, insoles and other footwear inserts in a particularly efficient and reliable manner. The resulting custom orthotics and insoles are well adapted to provide foot support throughout the gait cycle.

At least one embodiment of an apparatus to assist in making an orthotic, insole or other footwear insert that is customized to a plantar surface of an individual's foot may be summarized as including a portable housing and a heater unit coupled to the portable housing to selectively heat the orthotic or a heel cap of the footwear insert to increase the pliability of the orthotic or the heel cap. The apparatus may further include at least one alignment device coupled to the portable housing to assist in positioning and orientating the individual's foot prior to conforming the orthotic or the heel cap to the plantar surface of the individual's foot. Moreover, the apparatus may further include a vacuum system coupled to the portable housing and including a control device to selectively apply a vacuum around the individual's foot to bring the orthotic or the heel cap into conformance with the plantar surface of the individual's foot prior to setting of the orthotic or the heel cap.

The alignment devices may include a cradle for a distal end of the individual's leg, the cradle being adjustably movable toward and away from a foot receiving area of the apparatus; a support device adjustably positionable within the foot receiving area to selectively underlie and stabilize a metatarsal head of the individual's foot while the distal end of the individual's leg is supported by the cradle; and a laser device and associated control positioned to selectively generate one or more visible alignment indicators on the individual's foot and the distal end of the individual's leg to assist in positioning and orientating the individual's foot within the foot receiving area.

At least one embodiment of a method of making a customized insole assembly may be summarized as including: heating a rigid heel cap to increase the pliability of the heel cap with a portable insole customization unit; attaching the heel cap in a pliable condition to a full length foam insole to form a stock insole assembly; positioning the stock insole assembly on a plantar surface of an individual's foot with the heel cap remaining in the pliable condition; ensuring a desired positioning and orientation of the individual's foot and a distal end of the individual's leg with the assistance of one or more alignment devices of the portable insole customization unit; and prior to setting of the heel cap, forming the stock insole assembly into conformance with the plantar surface of the individual's foot to form the customized insole assembly using a vacuum system of the portable insole customization unit.

Ensuring a desired positioning and orientation of the individual's foot and the distal end of the individual's leg with the assistance of the one or more alignment devices of the portable insole customization unit may include: guiding the individual's foot into proximity with a foot receiving area of the portable insole customization unit while the distal end of the individual's leg is supported by a cradle which is movably coupled to a housing of the portable insole customization unit to move back and forth toward and away from the foot receiving area; adjusting a support device movably coupled to a housing of the portable insole customization unit to underlie and stabilize a metatarsal head of the individual's foot, preferably a fifth metatarsal head area of the individual's foot; and/or adjusting a position or an orientation of the individual's foot or the distal end of the individual's leg relative to the portable insole customization unit such that a visible alignment indicator generated by the portable insole customization unit is aligned with one or more target locations on the individual's foot or the distal end of the individual's leg.

At least one embodiment of a method of making a customized orthotic may be summarized as including: heating a rigid orthotic to increase the pliability of the orthotic with a portable orthotic customization unit; positioning the orthotic on a plantar surface of an individual's foot with the orthotic remaining in a pliable condition; ensuring a desired positioning and orientation of the individual's foot and a distal end of the individual's leg with the assistance of one or more alignment devices of the portable orthotic customization unit; and prior to setting of the orthotic, forming the orthotic into conformance with the plantar surface of the individual's foot to form the customized orthotic using a vacuum system of the portable orthotic customization unit.

Ensuring a desired positioning and orientation of the individual's foot and the distal end of the individual's leg with the assistance of the one or more alignment devices of the portable orthotic customization unit may include: guiding the individual's foot into proximity with a foot receiving area of the portable orthotic customization unit while the distal end of the individual's leg is supported by a cradle which is movably coupled to a housing of the portable orthotic customization unit to move back and forth toward and away from the foot receiving area; adjusting a support device movably coupled to a housing of the portable orthotic customization unit to underlie and stabilize a metatarsal head of the individual's foot, preferably a fifth metatarsal head area of the individual's foot; and/or adjusting a position or an orientation of the individual's foot or the distal end of the individual's leg relative to the portable orthotic customization unit such that a visible alignment indicator generated by the portable orthotic customization unit is aligned with one or more target locations on the individual's foot or the distal end of the individual's leg.

BRIEF DESCRIPTION OF THE SEVERAL VIEWS OF THE DRAWINGS

FIGS. 2 through 10 illustrate a sequence of forming a custom insole, according to one embodiment, using the example apparatus of FIG. 1, in which:

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known devices, structures and techniques associated with custom orthotics, insoles or other footwear inserts and methods of making the same may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
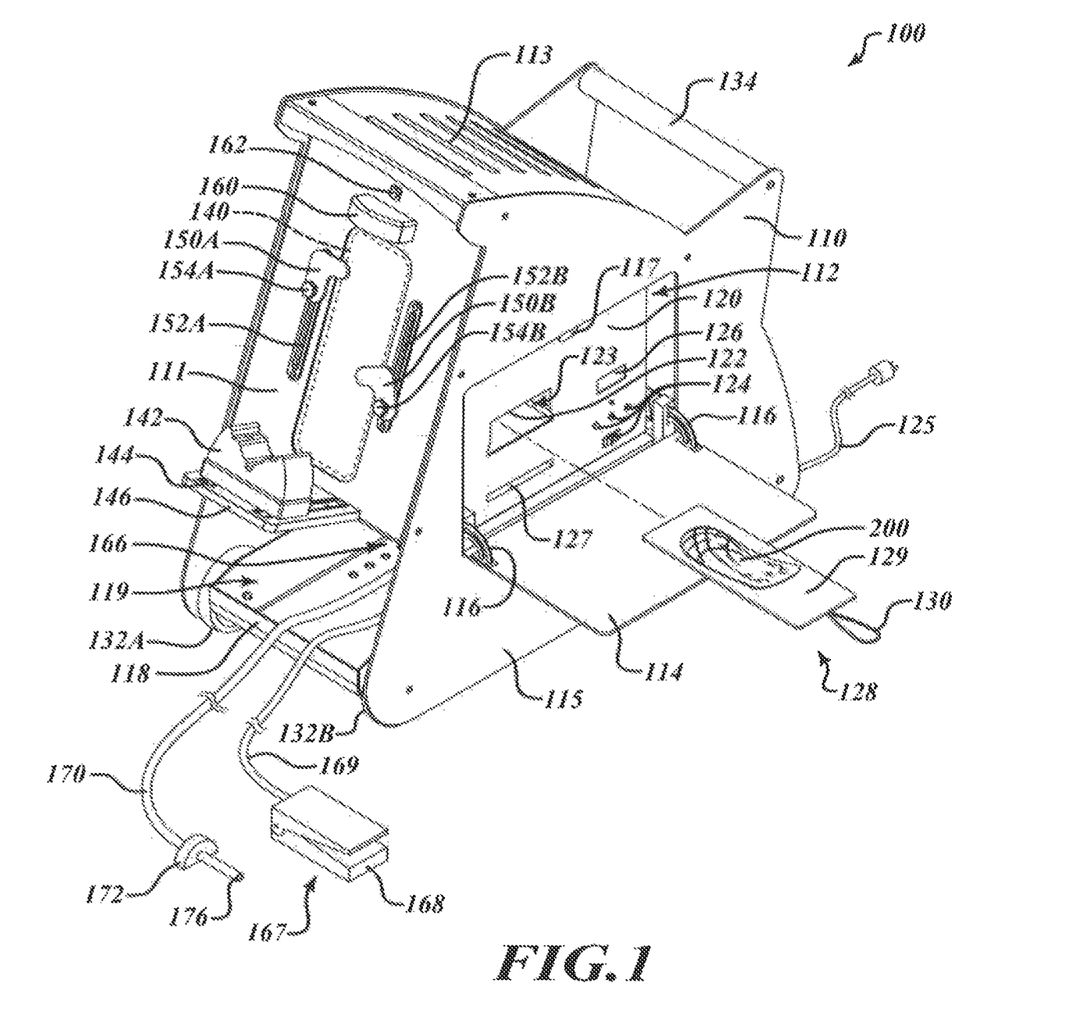
FIG. 1 is an isometric top view of an apparatus for making custom orthotics, insoles and other footwear inserts, according to one example embodiment.

FIG. 1 shows an apparatus 100 for making custom orthotics, insoles and other footwear inserts, according to one example embodiment, and FIGS. 2 through 10 illustrate a sequence of forming a custom insole for footwear, according to one example embodiment, with the assistance of the apparatus 100.

With reference to FIG. 1 the apparatus 100 may include a portable housing 110 that generally defines an enclosure for, among other things, a heater unit 120 (e.g., an oven) that is provided to selectively heat an orthotic, heel cap 200 or other substantially rigid footwear insert member during use to increase its pliability. The heater unit 120 may be concealed or substantially concealed within an internal cavity 112 defined by the portable housing 110. The portable housing 110 may also include one or more vents 113 (e.g., louvers, screens, plurality of apertures, etc.) to vent heated air generated by the heater unit 120 during use out from within the internal cavity 112. The vents 113 may be formed integrally in the portable housing 110, and may be provided in at least an upper portion of the portable housing 110.

The portable housing 110 may further include a door 114 to provide selective access to at least a portion of the heater unit 120. For example, the example embodiment of the apparatus 100 may include a door 114 that is pivotally connected to a side 115 of the housing by hinges 116 to move between a closed position (not shown), in which the door 114 is substantially parallel to the side 115 of the apparatus 100, and an open position, in which the door is generally perpendicular to the side 115 of the apparatus 100, as shown in FIG. 1. In the open position, the door 114 may serve as or otherwise provide a work surface upon which a user or operator of the system may position various implements to assist in a custom orthotic, insole or other footwear insert fabrication process. The door 114 may be held closed by a latching mechanism 117, such as, for example, a magnetic, push-button latching mechanism. Accordingly, a user can quickly gain access to the heater unit 120 when needed, or otherwise conceal or substantially conceal the heater unit 120 when the apparatus 100 is not being used.

The heater unit 120 may comprise an oven having an opening 122 to receive an orthotic, heel cap 200 or other substantially rigid footwear insert and to heat the orthotic, heel cap 200 or other substantially rigid footwear insert within a heated environment 123 to increase its pliability for subsequent formation to a plantar surface of an individual's foot. For this purpose, the heater unit 120 may further include one or more controls 124 (e.g., control buttons, knobs, sliders, touch screens, switches, indicators, etc.) and a display 126 for selectively controlling the operation of the heater unit 120. For example, the controls 124 may include a power switch for powering up and powering down the heater unit 120. An indicator light or lights may be provided to communicate information to the user, such as, for example, when the heated environment 123 provided by the heater unit 120 has reached a threshold or desired temperature. One or more buttons may be provided for setting a timer or otherwise assisting in ensuring that the orthotic, heel cap 200 or other substantially rigid footwear insert is exposed to the heated environment 123 for a time sufficient to increase its pliability to a point where it is pliable yet not overly sticky or unusable. The display 126 may display, for example, a temperature reading indicative of a temperature of the heated environment 123 and/or a time remaining to reach the desired pliability. The heater unit 120 (and any other powered components of the apparatus) may receive power from a power cable 125 that may extend from the apparatus 100 for coupling the apparatus 100 to a power source such as mains power.

In some instances, the heater unit 120 may further include a storage cavity 127 for storing an implement 128, such as a spatula or other tool, which is provided for supporting the orthotic, heel cap 200 or other substantially rigid footwear insert while it is inserted in the opening 122 to be heated within the heated environment 123. The implement 128 may include a generally planar support platform 129 and a handle 130 for manipulating the implement 128 and retrieving it and the orthotic, heel cap 200 or other substantially rigid footwear insert from within the heated environment 123 when the orthotic, heel cap 200 or other substantially rigid footwear insert reaches the desired pliability.

Figure 7:
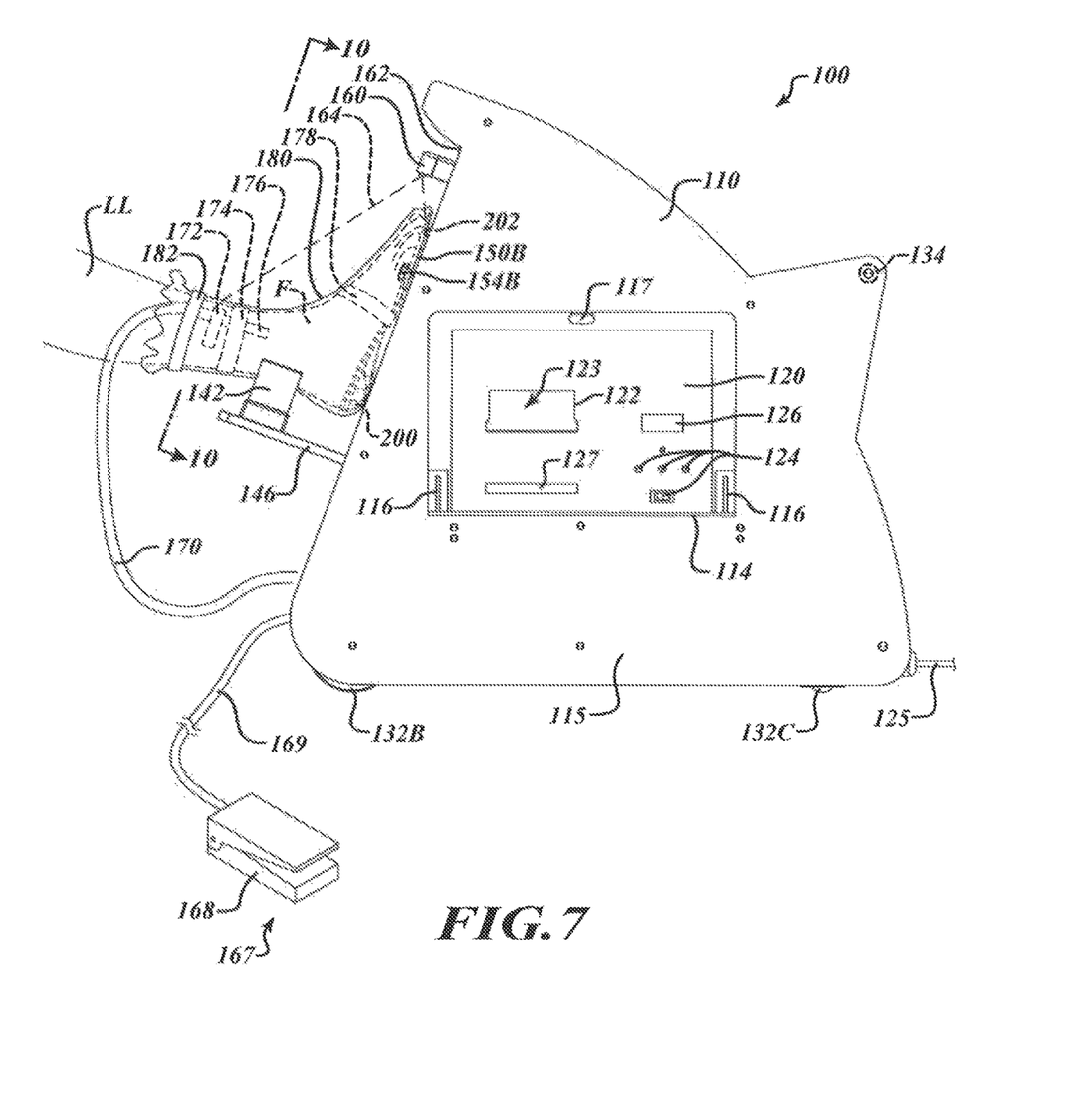
FIGS. 7 and 8 illustrate, prior to conforming the heel cap to the plantar surface of the individual's foot, positioning and orienting the individual's foot and the insole assembly with the assistance of the apparatus of FIG. 1.

According to the example embodiment of the apparatus 100, an arrangement of wheels 132A-C may be provided to extend from the portable housing 110 to engage a ground surface upon which the portable housing 110 is supported. For example, a set of front wheels 132A, 132B may be provided to extend downwardly from a front end of the portable housing 110 and a rear wheel 132C may be provided to extend downwardly from a rear end of the portable housing 110, as shown in FIG. 7. The arrangement of wheels 132A-C may include different types of wheels, including ball casters. The arrangement of wheels 132A-C may be in a triangular configuration as shown in the example embodiment of the apparatus 100, and may be positioned and configured to enable side-to-side micro-adjustments for adjusting the angular orientation of the apparatus relative to the individual being fitted with the custom orthotic, insole or other footwear insert. A handle 134 may be coupled to the portable housing 110 to further assist in angular adjustments of the portable housing 110 relative to the individual by guiding the tail end of the portable housing 110 over the ground surface by the handle 134 and with the assistance of the arrangement of wheels 132A-C. The handle 134 may be offset from an upper or rear end of the portable housing 110. The handle 134 may be formed integrally in the portable housing 110 or coupled thereto. The handle 134 may also provide a convenient device for carrying, lifting or transporting the apparatus 100 from one location to another.

With continued reference to FIG. 1, the apparatus 100 further includes a plurality of alignment devices coupled to the portable housing 110 to assist in positioning and orientating the individual's foot prior to conforming the orthotic, heel cap or other substantially rigid footwear insert to the plantar surface of the individual's foot.

For instance, the example apparatus 100 includes a cradle 142 that is provided to support a lower or distal end of the individual's leg LL. The cradle 142 is adjustably movable toward and away from a foot receiving area 140 of the apparatus 100. More particularly, the cradle 142 is adjustably movable along a pair of adjustment tracks 144 provided on a support platform portion 146 of the portable housing 110 which extends outwardly and generally perpendicular to a front face 111 of the portable housing 110 and the foot receiving area 140. In this manner, the distal end or lower leg LL of the individual to be fitted with the custom orthotic, insole or other footwear insert may have his or her leg supported in the cradle 142 during conforming of the orthotic, heel cap 200 or other footwear insert to the individual's foot F. In addition, the position and orientation of the individual's foot F may be manipulated or otherwise adjusted while the cradle 142 continuously supports the lower leg LL as the cradle 142 translates along the adjustment tracks 144 during such manipulation or adjustment of the individual's foot.

As another example, the example apparatus 100 further includes a pair of foot support devices 150A, 150B positioned adjacent the foot receiving area 140 on opposing sides thereof. Each support device 150A, 150B is selectively positionable to underlie and stabilize a metatarsal head of the individual's foot F from a respective side of the individual's foot F while the lower or distal end of the individual's leg LL is supported in the cradle 142. As shown best in FIG. 8, each of the support devices 150A, 150B may be shaped to underlie and stabilize a metatarsal head of the individual's foot without interfering or contacting the orthotic, heel cap 200 or other footwear insert as the orthotic, heel cap or other footwear insert is brought into conformance with the plantar surface of the individual's foot F. Each of the support devices 150A, 150B may be adjustably movable back and forth in a direction generally parallel to a reference plane defined by the foot receiving area 140 of the apparatus 100 and rotatably adjustable about a respective axis 152A, 152B generally perpendicular to the reference plane to enable adjustment of the support device 150A, 150B to accommodate feet of different sizes. Tension locks 154A, 154B or other fastening devices may be provided to selectively lock each support device 150A, 150B in a desired vertical position and a desired angular orientation. Preferably, each support device 150A, 150B is shaped to underlie and stabilize the individual's foot F only beneath a fifth metatarsal head area of the individual's foot, as represented, for example, with the target labeled 156 in FIG. 8 for the right side support device 150B, which is provided for supporting the individual's right foot during making of a custom orthotic, insole or other footwear insert for the right foot. As can be appreciated from FIG. 8, the other left side support device 150A may be pivoted out of the foot receiving area 140 so as not to interfere with the fabrication process for the orthotic, insole or other footwear insert for the right foot.

As yet another example, the example apparatus 100 may further include a laser device 160 and associated control 162 (e.g., a push button) which is positioned to selectively generate one or more visible alignment indicators 164 (i.e., a laser beam, line or spot) onto target locations 157, 158 on the individual's foot FF and the lower or distal end of the individual's leg LL to assist in positioning and orientating the individual's foot within the foot receiving area 140. The laser device 160 may be activated and deactivated by the associated control 162 and may receive power from mains power via the power cable 125 or from a separate onboard power source, such as a separate battery power source, for example.

The apparatus 100 may further include a vacuum system 166 that is coupled to the portable housing 110 and that includes a control device 167 (e.g., a foot pedal 168) to selectively apply a vacuum around the individual's foot to bring the orthotic, heel cap 200 or other footwear insert into conformance with the plantar surface of the individual's foot prior to setting of the orthotic, heel cap 200 or other footwear insert. The control device 167 may comprise a foot pedal 168 that is communicatively coupled to the vacuum system 166 via an electrical cable 169 to enable a user to activate the vacuum system 166 from a location external of or remote from the portable housing 110. In other instances, the control device 167 may comprise a handheld toggle or other controller. The vacuum system 166 may further include a suction tube 170 for applying suction generated by a vacuum pump or vacuum unit 171 (FIG. 8) to evacuate a space around the individual's foot F. A fitting 172 may be provided near an intake end 176 of the suction tube 170 to assist in fitting the intake end 176 of the suction tube 170 to the individual's lower leg LL or ankle and creating a sealed environment around the individual's foot F.

According to some embodiments, the portable housing 110 of the example apparatus 100 may further include a storage receptacle 118 positioned beneath the foot receiving area 140, which defines a storage space 119 to store one or more operable portions of the vacuum system 166 (e.g., the suction tube 170 and control device 167) or other components of the apparatus 100. In some instances, the storage receptacle 118 may be movably coupled to the housing 110 to enable a user to extend the storage receptacle 118 from the housing 110 to receive contents therefrom. In other instances, the storage receptacle 118 may be fixedly secured to the housing 110 or integrally formed in a lower portion of the housing 110.

Having described various features and components of the example apparatus 100 of FIG. 1, reference is now made to FIGS. 2 through 10 for describing methods of making custom orthotics, insoles and other footwear inserts using the example apparatus 100 or variations thereof. Although methods will be described with reference in particular to making a custom insole including a rigid heel cap 200 coupled to a full-length flexible insole 202, it will be appreciated that many aspects of the methods can be applied to a wide variety of footwear inserts including three-quarter length orthotics consisting of a unitary structure of material.

Figure 2:
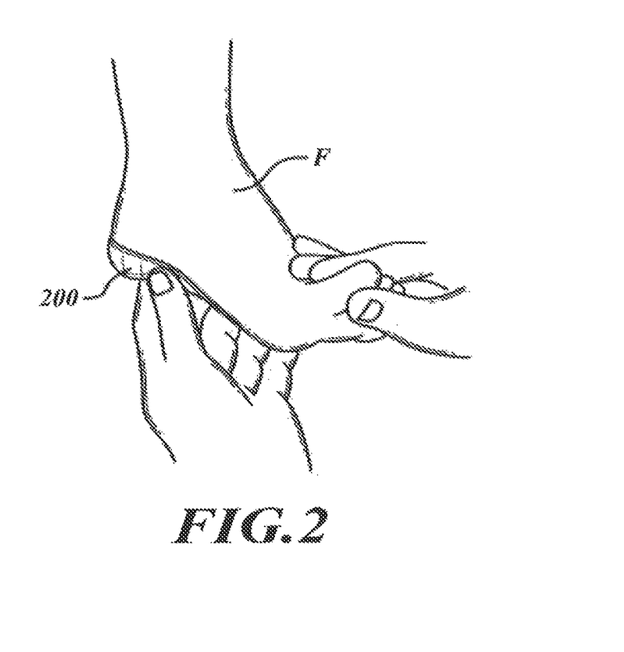
FIG. 2 illustrates an initial fitting of a heel cap of the insole to an individual's foot.

Generally, the method may begin by having an individual for whom the pair of custom orthotics or insoles is being made to sit on a raised chair or bench. Then the rigid heel cap 200 may be placed against the plantar surface of the individual's foot F, as illustrated in FIG. 2, to check for proper initial sizing of the heel cap 200. The leading edge of the heel cap 200 should reach just behind the metatarsal heads of the individual's foot F.

Figure 3:
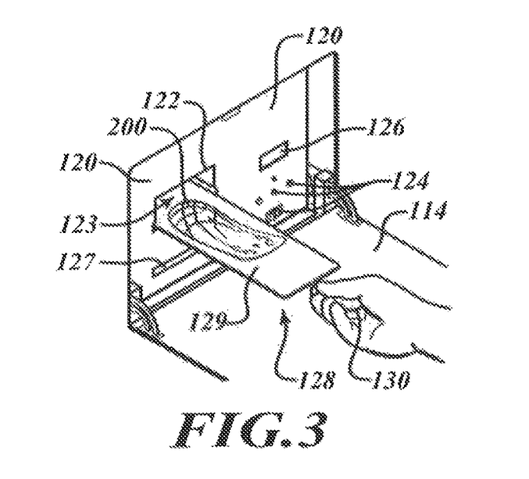
FIG. 3 illustrates placement of the heel cap in a heater unit of the apparatus of FIG. 1 to heat the heel cap and increase its pliability.

Next, as illustrated in FIG. 3, the rigid heel cap 200 may be placed on an implement 128 and inserted within the opening 122 of the heater unit 120 of the apparatus 100. In FIG. 3, aft end or heel portion of the heel cap 200 is shown as being placed into the opening 122 first; however, if the heated environment 123 provided by the heater unit 120 is not uniform, it may be desirable to place a leading end of the heel cap 200 into the opening 122 first to ensure that the midfoot and forefoot portions of the heel cap 200 are adequately heated. In any event, the heating step illustrated in FIG. 3 is accomplished so that desirably the entire heel cap 200 is heated to a moderately elevated temperature (e.g., between about 150° F. and about 300° F.) so that the material forming the heel cap 200 is sufficiently pliable or yielding so that it can be deformed and contoured to the individual's foot F (as will be described hereinafter) so as to take a permanent set matching the desired contour for the plantar surface of the individual's foot F. In some instances, the heating step may take about three minutes for some material types, such as, for example, a polymer blend including carbon fiber elements. As will be appreciated by those of ordinary skill in the relevant art, however, residence time may vary depending on the material of the heel cap 200, the thickness of the heel cap 200, and/or other factors, such as, for example, the temperature of the heated environment 123 to which the heel cap 200 is subjected.

Figure 4:
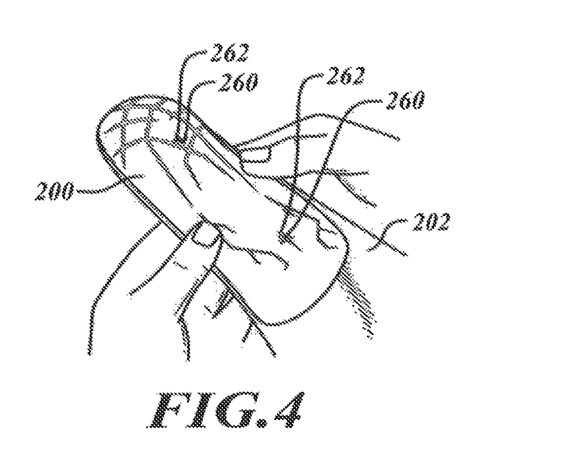
FIG. 4 illustrates combining the pliable heel cap with another portion of the insole to form an insole assembly.

After the heel cap 200 has been adequately heated, it may then be pressed against the full-length flexible insole 202 so that the upper surface of the heel cap 200 engages the lower surface of the full-length flexible insole 202, as illustrated in FIG. 4. Lower protruding alignment portions 260 can be provided on the full-length flexible insole 202 and shaped and sized to fit into corresponding apertures 262 in the heel cap 200 to assist in properly aligning the heel cap 200 with the full-length flexible insole 202. The upper surface of the heel cap 200 may be provided with a suitable adhesive which softens when heated, so that the full-length flexible insole 202 becomes bonded to the heel cap 200 upon cooling.

Figure 5:
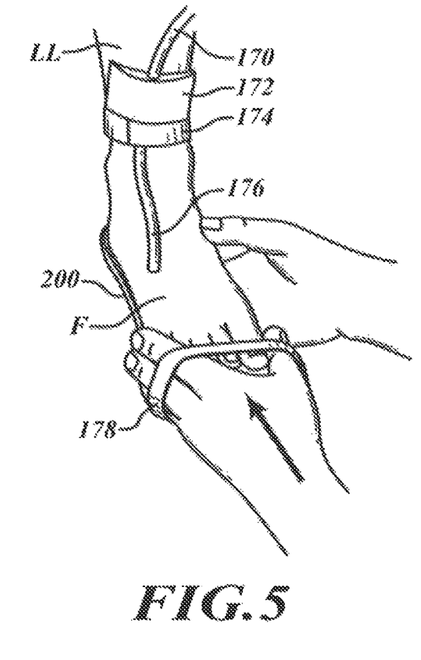
FIG. 5 illustrates securing the insole assembly against the plantar surface of the individual's foot.

Next, there is the utilization of a foot positioning and vacuum forming technique using the apparatus 100 to form the heel cap 200 and the full-length flexible insole 202 to the plantar surface of the individual's foot. As illustrated in FIG. 5, a suction tube 170 may be applied to the individual's lower leg LL or ankle by using, for example, a fitting 172 and an elastic band 174. The intake end 176 of the tube 170 may be positioned on the upper surface of the individual's midfoot as shown in FIG. 5. A band or strap 178 or other securing device may be provided around the individual's foot F to hold the assembled heel cap 200 and full-length flexible insole 202 in place against the plantar surface of the foot F.

Figure 6:
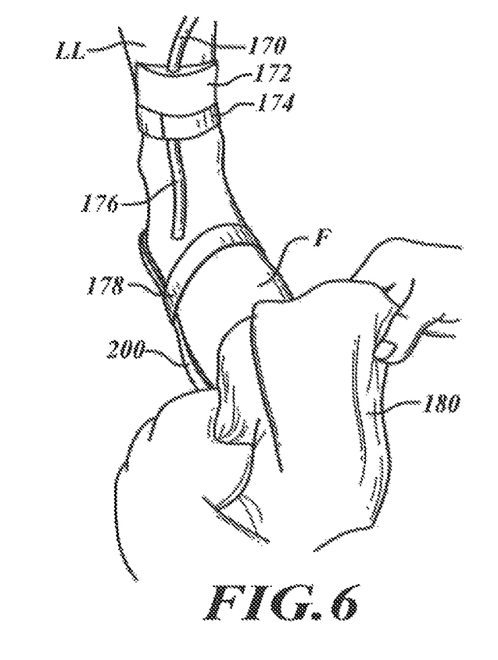
FIG. 6 illustrates enclosing the individual's foot and the insole assembly in a flexible bag.

As illustrated in FIG. 6, a flexible bag 180 may then be placed around the foot F and upwardly around the lower leg LL or ankle. As shown in FIG. 7, the upper part of the bag 180 which is around the lower leg LL or ankle may be pressed against the ankle by means of a peripheral band or strap 182. The upper part of the bag 180 may be rolled and/or folded prior to securing it to the individual's lower leg LL or ankle to assist in creating a generally sealed environment around the individual's foot F.

Prior to bringing the assembled heel cap 200 and full-length flexible insole 202 into conformance with the plantar surface of the individual's foot, an operator may assist the individual in positioning and orienting his or her foot F in a desired position with the forward part of the foot F appropriately position and oriented relative to the rear portion of the foot F. This will be done with the aid of the apparatus 100 and generally in a manner so that the foot F is in a neutral position, with the forward part of the foot being positioned so that the midtarsal joint is in its locked or nearly locked position, as discussed in greater detail below.

Figure 8:
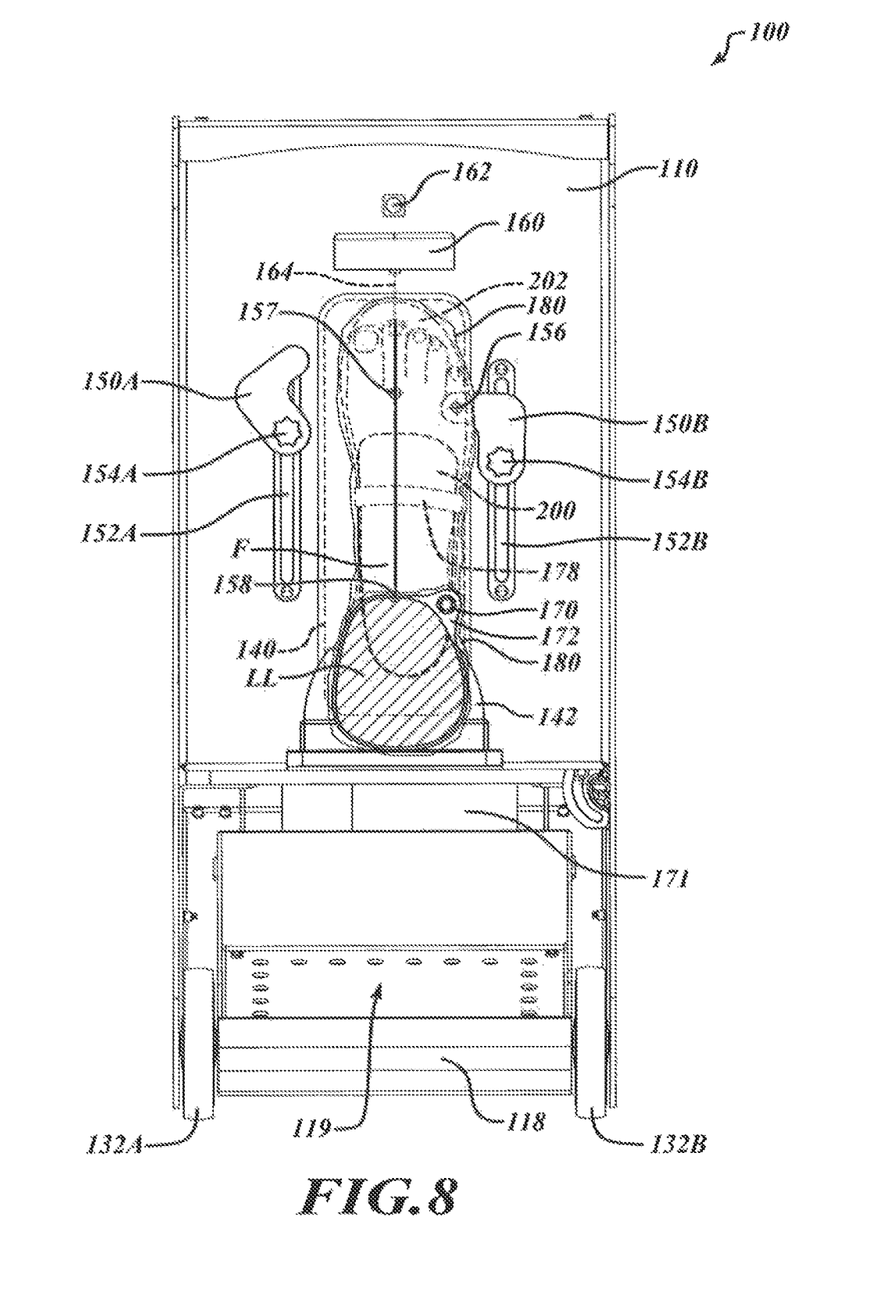

With reference to FIGS. 7 and 8, the alignment devices coupled to the portable housing 110 serve to position and load the foot F such that the bone structure is held steady with the subtalar joint in the "neutral" position and with the midtarsal joint locked, which is important for properly placing the foot F in a position and orientation that is needed to construct an effective orthotic, insole or other footwear insert. The bone structure of a functional human foot transitions through a series of phases beginning with heel strike (when the heel makes initial contact with the ground or other surface), with the bone structure initially being somewhat loose and free to collapse and spread to a degree in order to absorb shock and conform to the underlying surface. Then as weight moves forwardly on the foot, with forward motion of the body, the bone structure transitions to a comparatively rigid configuration. In particular, the center of weight, as borne by the plantar surface of the foot, initially follows a somewhat forward and lateral path, as the rearfoot simultaneously undergoes eversion, with the midtarsal joint becoming "locked" as the center of weight transfers onto the area of the fifth metatarsal head (generally in the area beneath the base of the small toe). The midtarsal joint remains locked for the remainder of the gait cycle, so that the foot forms a substantially rigid "lever" for efficiently transmitting force to the ground during toe-off. Again, a more complete explanation of the gait cycle and the locking and unlocking of the metatarsal joint may be found in U.S. Pat. No. 5,960,566, which is incorporated herein by reference.

The alignment devices coupled to the portable housing 110 exploit the characteristics of the foot as a rigid lever, as described in the preceding paragraph, to locate the foot in a desired position and orientation for forming a custom orthotic, insole or other footwear insert to the plantar surface thereof. This can be accomplished without distorting the soft tissue or bone structure of the foot.

As can be seen best in FIG. 1, the cradle 142 is preferably somewhat U or V-shaped so as to have a centering effect on the rearfoot, and therefore also the distal of lower portion of the leg LL, and is spaced somewhat away from the foot receiving area 140 (or general plane of the plantar surface). The cradle 142 may retainingly engage the leg in an area located near the top of the heel area/bottom of the distal one-third of the lower leg LL, with the size and angle of the U or V-shaped area being configured to hold this area of the leg firmly but without discomfort to the individual. The cradle 142 is generally located along the centerline of the housing 110, thus allowing it to be used with either right or left feet.

As can be seen with continued reference to FIGS. 7 and 8, the adjustable foot support devices 150A, 150B may be positioned inwardly towards the centerline of the housing 110, and are preferably formed of a rigid material that is capable of applying a dorsally-directed force to the plantar surface of the foot F. The foot support devices 150A, 150B are preferably sized and shaped to selectively engage only the area of the foot F immediately beneath the fifth metatarsal head.

The foot support devices 150A, 150B are movably adjustable to accommodate different lengths and widths of feet. More particularly, the foot support devices 150A, 150B can be selectively adjusted longitudinally (up and down) and rotated angularly so as to position a respective distal portion of the foot support devices 150A, 150B beneath the fifth metatarsal head area of feet having different sizes, the right side support device 150B being used for right feet and the left side support device 150A being used for left feet.

As previously described, the position of the cradle 142 is also adjustable to accommodate feet and legs of different sizes. More particularly, the cradle 142 can be selectively slid towards and away from the foot support devices 150A, 150B to accommodate feet having smaller/shorter or bigger/taller rearfoot areas and/or difference in the size of the distal one-third of the lower leg LL.

The laser device 160 may be provided above the foot receiving area 140 to project a visible alignment indicator 164 (i.e., a laser beam, line or spot) onto target locations 157, 158 generally along the centerline of housing 110 and also in alignment with the center of the cradle 142, as indicated by the dashed lines in FIGS. 7 and 8. The visible alignment indicator 164 (i.e., a laser beam, line or spot) thus provides a visual reference line for the center plane of the apparatus 100 as a whole.

As was noted above, the alignment devices serve to orientate the bone structure of the foot F with the midtarsal joint in the locked position, employing alignment of the bone structure in conjunction with a dorsally-directed (upward) loading of the fifth metatarsal head, essentially mimicking the reactive force of gravity experienced by the fifth metatarsal head at the corresponding point in the gait cycle.

Example steps in accomplishing the positioning and locking of the foot F are now described in greater detail with continued reference to FIGS. 7 and 8. As an initial step, the apparatus 100 is brought into proximity with the seated patient, so that the centerline that is established by the laser device 160 and cradle 142 is in general alignment with and towards the individual's hip on the side of the foot F that is to be fitted with the custom orthotic, insole or other footwear insert (e.g., in general alignment with the right portion of the hip if the right foot is to be fitted). The individual's lower leg LL is then placed in the cradle 142, with the knee slightly bent (raised), and with the ankle dorsiflexed and the heel thrust forward, so that the plantar surface of the heel is located proximate the foot receiving area 140 and a plane defined by the foot support devices 150A, 150B. In so doing, the cradle 142 takes the majority of the weight off of the extremity, while simultaneously centralizing the rearfoot and distal one-third of the lower leg LL relative to the foot receiving area 140. The user or operator may adjust the appropriate foot support device 150A, 150B so that it is positioned beneath the lateral forefoot, and in particular the fifth metatarsal head of the bone structure as shown best in FIG. 8, and the patient then plantarflexes the ankle joint so as to lower the forefoot. In so doing, the plantar surface of the forefoot in the area beneath the fifth metatarsal head comes into contact with a distal portion of the appropriate foot support device 150A, 150B, so that the fifth metatarsal head is held against further movement in the plantar direction. Plantarflexing the forefoot merely requires the individual to relax the ankle from holding the foot from the "heel forward" condition in which the foot F is initially set in the cradle 142, so that when the forefoot is fully relaxed and lowered, the fifth metatarsal head is subject to an upward (dorsally-directed) force mimicking the loading of the fifth metatarsal head created by the force of gravity during the corresponding phase of the natural gait cycle. A dorsally-directed force sufficient to load the fifth metatarsal head to resistance is created merely by the tension exerted by the muscles of the lower leg when in a relaxed condition, acting through the Achilles tendon and with the ankle joint serving as the fulcrum, so that the midtarsal joint assumes the locked configuration without the patient having to purposely press down on the forefoot using the muscles and ligaments in a manner that might cause distortion of the foot F or deviation from the correct shape, and without the area of the fifth metatarsal head having to bear excessive weight that might also cause distortion of the tissues and/or patient discomfort.

To centralize the foot F relative to the central axis of the foot receiving area 140 and place the subtalar joint in a neutral condition, while keeping the midtarsal joint locked, the lower leg LL is next adjusted to position the second metatarsal head (in the area proximate the base of the second toe, labeled 157 in FIG. 8) with the alignment indicator 164 (i.e., laser beam, line or spot) that is projected by the laser device 160, alignment indicator 164 being aligned with the center of the cradle 142 as noted above. The patient's knee may then be lowered and the ankle joint concurrently plantarflexed to about 90°, which may push the apparatus 100 away from the chair or other support on which the patient is seated. In response, the apparatus 100 may roll away from the individual over the floor or other support surface upon which it is supported. The apparatus 100 may be permitted to turn in an arc towards a patient's centerline as the apparatus 100 moves away from the patient, thus accommodating the natural inward deviation (angle towards the midline of the body) that is present in most lower legs. The effect of the combined distal and medial motion of the apparatus 100 is to bring the second metatarsal head of the foot F into general alignment with the distal one-third of the lower leg LL so as to place the subtalar joint in the neutral condition, with the alignment being verified visually by the alignment indicator 164 (i.e., laser beam, line or spot) pausing over the top of the second metatarsal head and up the distal portion of the lower leg LL. To the extent that minor corrections or "fine tuning" of the alignment is needed, this is easily performed by simply adjusting the tail end of the housing 110 relative to the individual to bring the second metatarsal head and lower third of the lower leg LL into alignment with the alignment indicator 164 (i.e., laser beam, line or spot) generated by the laser device 160.

It will be understood that various arrangements of casters or wheels may be used on the housing 110 to allow the rolling and turning action, and furthermore that in some instances the individual may be seated on a chair or other support that rolls away from and/or turns relative to the apparatus 100 rather than vice versa.

Positioned and locked in the manner described, the foot support device 150A, 150B on which the fifth metatarsal head rests effectively establishes the transverse plane of the foot F, at a position proximate the foot receiving area 140 of the apparatus 100. Since, in the illustrated embodiment, the cradle 142 holds the rearfoot and distal one-third of the lower leg LL essentially perpendicular to the plane of foot support devices 150A, 150B, the foot support devices 150A, 150B effectively establish a transverse plane of the foot F at essentially 0° eversion/inversion relative to the front face 111 of the housing 110. However, individual feet vary greatly, and depending on the degree of eversion exhibited by the foot (e.g., 6° everted, 8° everted, and so on), the medial aspect of the forefoot may in some instances be positioned above the 0° transverse plane or below the 0° transverse plane when the midtarsal joint is locked and the subtalar joint is in the neutral position. Therefore, another significant advantage of embodiments of the present invention, in which a support device 150A, 150B exists only under the lateral forefoot and preferably only under the fifth metatarsal head rather than all the way across the foot, is that the medial aspect of the foot is free to elevate above or depress beyond the 0° transverse plane as the nature of the particular foot dictates, which is not possible in the case of devices in which the entire width of the foot is pressed against a plate or other continuous support or surface.

With the foot F aligned and held in the manner described, the entire plantar surface of the foot F is appropriately positioned and oriented for conforming the assembled components of the insole (i.e. the heel cap 200 and the full-length flexible insole 202) to the plantar surface. Accordingly, the vacuum system 166 may be activated (e.g., via foot switch 168) to withdraw air through the tube inlet 176 of the suction tube 170 to evacuate the bag 180 and force the assembled components (i.e. the heel cap 200 and the full-length flexible insole 202) against the planter surface of the individual's foot F with an appropriate pressure.

It is to be understood that the heel cap 200, when heated, is sufficiently pliable or yielding so that the force of the atmospheric pressure (resulting from the application of the vacuum within the bag 180) is sufficient to shape the heel cap 200 so that it will properly conform to the plantar surface of the individual's foot F. Thus, with the apparatus 100 assisting in properly positioning and orienting the individual's foot, the heel cap 200, and consequently the full-length flexible insole 202, assume a shape closely corresponding to the plantar surface of the individual's foot F, where the foot F is in the optimized position, as discussed above.

Within a short period of time, the heel cap 200 will cool to room temperature, so that the heel cap 200 will harden into the proper configuration which it had assumed during the vacuum forming process described above. In some embodiments, a fan or other cooling device may be coupled to or otherwise provided with the apparatus 100 to assist in cooling the heel cap 200 and adjoining full-length flexible insole 202. Upon cooling, the heel cap 200 is fully bonded to the full-length flexible insole 202 to form the finished custom insole 204, such as, for example, the insole assembly 204 shown in FIGS. 9 and 10.

A customized insole for the other foot can be made in substantially the same manner as described above. It becomes apparent from the above description that one of the significant advantages of embodiments of the present invention is that a finished pair of orthotics, insoles or other footwear inserts, custom contoured to accommodate the individual characteristics of the individual's foot, can be produced relatively quickly and easily and with improved accuracy and repeatability provided by the apparatus 100 or variations thereof.

Figure 9:
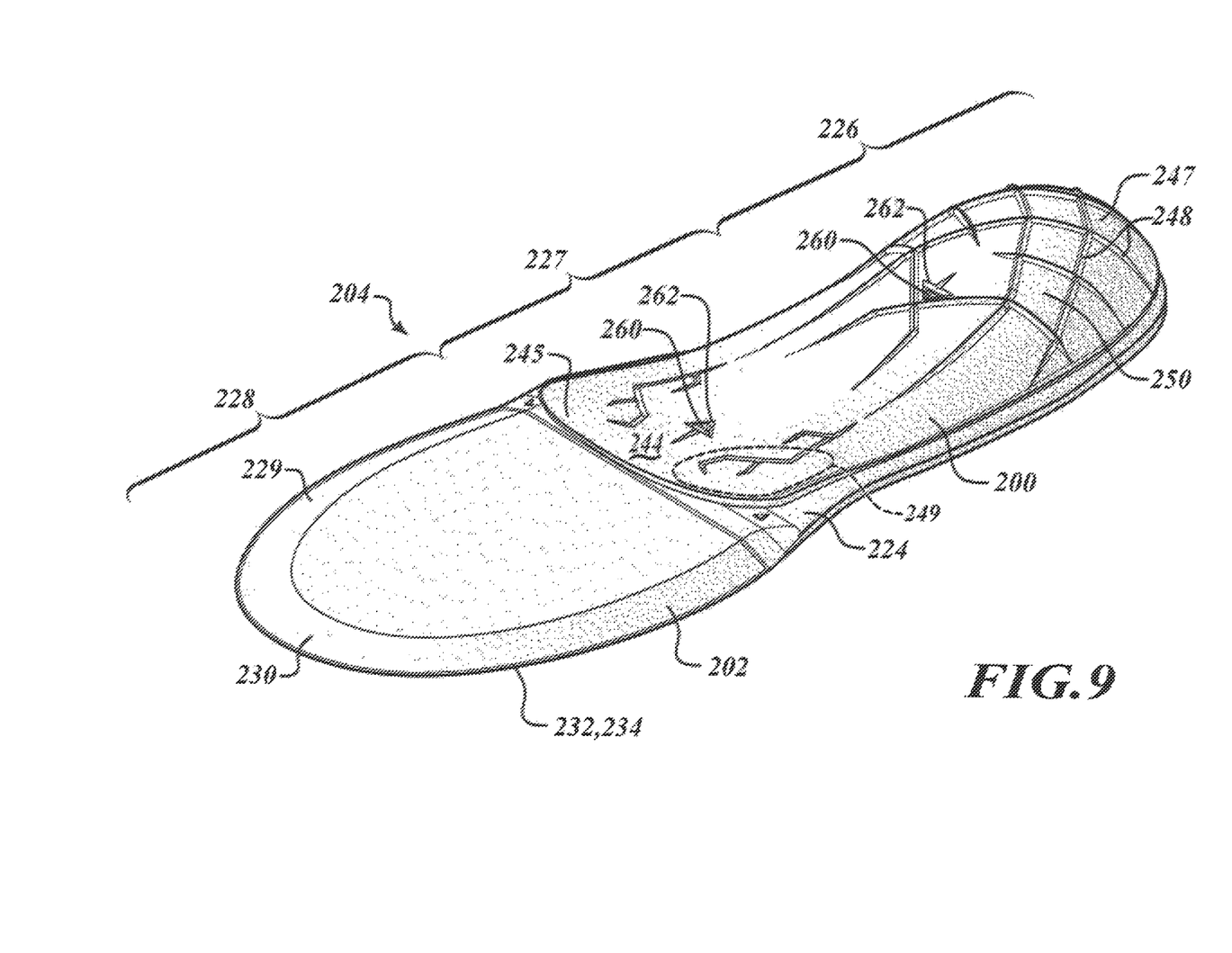
FIG. 9 shows an isometric bottom view of the resulting insole assembly.
Figure 10:
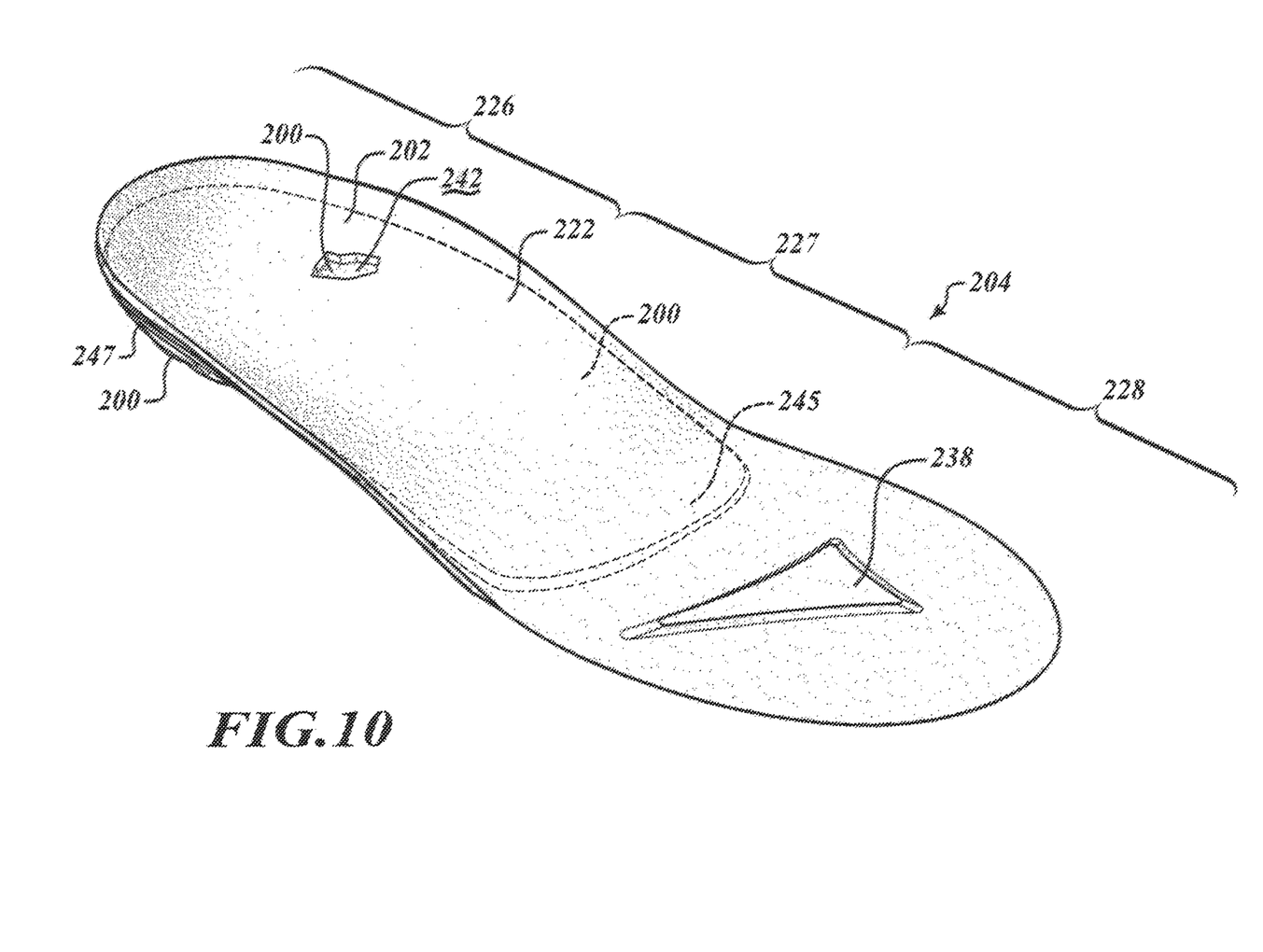
FIG. 10 shows an isometric top view of the resulting insole assembly.

Again, the resulting custom insole may have a form the same or similar to that shown in FIGS. 9 and 10, which illustrates an example right-side insole assembly 204 of a pair of symmetrically formed insole assemblies. The insole assembly 204 includes the full-length flexible insole 202 and the rigid heel cap 200 coupled thereto.

In some instances, the full-length flexible insole 202 may comprise a resiliently compressible foam material. The resiliently compressible foam material may be formed by an irradiation process which minimizes the size of air pockets formed therein and may lead to a reduction in weight of the resulting full-length flexible insole 202 relative to insoles formed of chemically cross-linked foams, for example. This may result in a full-length flexible insole 202 that is particularly lightweight yet sufficiently resilient to provide adequate cushioning and durability. In some instances, the full-length flexible insole 202 may comprise multiple layers of compressible foam material, wherein each layer includes different properties, such as, for example, a different durometer.

According to some embodiments, the rigid heel cap 200 may comprise a carbon fiber reinforced polymer material. The carbon fiber reinforced polymer material may comprise, for example, a polymer blend having up to or exceeding ten percent of carbon fibers by mass or volume to enhance the structural rigidity of the heel cap 200. This may result in a heel cap 200 that is particularly lightweight yet sufficiently rigid to provide adequate biomechanical support of the individual's foot. In such instances, the residence time of the heel cap 200 within the heated environment 123 may be longer relative to that of a heel cap 200 formed without carbon fiber elements, for example.

With continued reference to the example embodiment of the insole assembly 204 shown in FIGS. 9 and 10, the resulting full-length flexible insole 202 includes an upper contoured surface 222 that has been conformed to the plantar surface of the individual's foot and a lower contoured surface 224 opposite the upper contoured surface 222. The upper contoured surface 222 and the lowered contoured surface 224 are offset from each other and define a generally uniform thickness. The full-length flexible insole 202 also includes a heel portion 226 to engage and support a heel of the user's foot, a forefoot portion 228 to support a forefoot of the user's foot, and a midfoot portion 227 located therebetween.

The rigid heel cap 200 includes an upper contoured surface 242 and a lower contoured surface 244 opposite the upper contoured surface 242. The lower contoured surface 244 has the same general contours as the upper contoured surface 242 and is offset therefrom to define a thin shell structure. In some embodiments, the thickness of the thin shell structure defined between the upper and lower contoured surfaces 242, 244 may be exactingly uniform. In other instances, the thin shell structure defined between the upper and lower contoured surfaces 242, 244 may vary in thickness throughout portions of the heel cap 200. For example, a thickness of the heel cap 200 may taper towards the leading end 245 thereof. The heel cap 200 may also be thicker in certain regions, such as lateral side of the leading end of the heel cap 200, and may taper with increasing distance from the edge thereof to provide a section 249 that simulates a valgus wedge, for example.

Again, the heel cap 200 may being bonded, such as, for example, via adhesive, to the full-length flexible insole 202 with the upper contoured surface 242 of the heel cap 200 in contact with the lower contoured surface 224 of the full-length flexible insole 202 to underlie at least the heel portion 226 thereof and provide support thereto. The upper contoured surface 242 of the heel cap 200 will have contours that are the same general contours as the lower contoured surface 224 of the heel portion 226 of the full-length flexible insole 202 as a result of the vacuum forming process will nest closely together in the assembled configuration. Collectively, the full-length flexible insole 202 and the heel cap 200 provide a custom contoured support structure for engaging the plantar surface of the individual's foot and for providing proper biomechanical support of the heel and arch areas of the foot during use of the insole assembly 204.

As can be appreciated from the example insole assembly 204 shown in FIGS. 9 and 10, the heel cap 200 may extend from a heel or aft end 247 of the insole assembly 204 toward a toe of fore end thereof and may include a leading end 245 that terminates in a region aft of where the metatarsal heads or ball of a user's foot is expected to contact the full-length flexible insole 202. Accordingly, the rigid heel cap 200 may provide support predominately to the rearfoot and midfoot while enabling the user's foot to flex and extend in a natural manner about the metatarsophalangeal joints. The leading end 245 of the heel cap 200 may be particularly rigid and resistant to large amounts of deflection. In addition, the leading end 245 of the heel cap 200 may be configured to have a flexural rigidity or bending stiffness that is similar to that of the remainder of the heel cap 200 such that the heel cap 200 has a more uniform resistance to bending forces over a length thereof. This is opposed to reinforcement caps for insoles that may have more asymmetrical properties, such as, for example, a heel portion which has a flexural rigidity or bending stiffness that is an order or several orders of magnitude greater than an opposing end portion thereof, such as, for example, as the result of posts or other stiff features that may be predominately located in the aft end of the reinforcement cap. Advantageously, a heel cap 200 having a well-balanced stiffness or rigidity profile may result in a "balanced feel" across the entirety of the plantar surface of the user's foot during use. This should also help to reduce strain in the plantar fascia and reduce the resistance of the foot to supinating. In addition, the shape and rigidity of the leading end 245 of the heel cap 200 may assist in improving the function of the windlass mechanism by making the big toe easier to dorsiflex during the gait cycle.

With continued reference to FIGS. 9 and 10, the heel cap 200 may further include a plurality of engagement features 248 that protrude from the lower contoured surface 244 of the heel cap 200 to engage the midsole of the shoe or other footwear in which the insole assembly 204 is inserted for use. The engagement features 248 may be configured to resist motion of the insole assembly 204 relative to the midsole and to provide enhanced structural integrity to at least a rear portion or aft end 247 of the heel cap 200. As an example, the heel cap 200 may include engagement features 248 in the form of a series of elongated ridges that protrude from the lower contoured surface 244 of the heel cap 200 to engage or "bite" into the midsole and that stiffen the aft end 247 of the heel cap 200. In some instances, the elongated ridges or other engagement features 248 may intersect to provide enhanced structural integrity to at least the aft end 247 of the heel cap 200. The elongated ridges or other engagement features 248 may intersect to form isolated regions 250 of the lowered contoured surface 244 of the heel cap 200, such as, for example, the generally diamond-shaped regions 250 shown in FIG. 9. The elongated ridges or other engagement features 248 may run generally diagonally from the aft end 247 of the heel cap 200 toward the leading end 245 and may terminate at an intermediate location between the opposing ends 245, 247 of the heel cap 200. In some instances, the elongated ridges or other engagement features 248 may taper from one end thereof to the other. The elongated ridges or other engagement features 248 may be arcuate or curvilinear, linear or a combination thereof and may be continuous, staggered or disjointed. Advantageously, the elongated ridges or other engagement features 248 may embed in the midsole of a host shoe or other footwear and resist relative motion therebetween, both fore and aft and transversally.

With continued reference to FIGS. 9 and 10, the heel cap 200 may further include, an area of the forefoot portion 228 of the full-length flexible insole 202 and/or an area of the midfoot portion 227 may include a heat shield 229. The full-length flexible insole 202 may also include at least one raised toe crest portion 238 protruding from upper side thereof.

According to the example embodiment of the insole assembly 204 of FIGS. 9 and 10, an entirety of the heel cap 200 may be located within a reference boundary that is offset from the lower contoured surface 224 of the full-length flexible insole 202 by a generally uniform thickness T of the full-length flexible insole 202. In other embodiments, an entirety of the heel cap 200 apart from the plurality of engagement features 248 may be located within the reference boundary that is offset from the lower contoured surface 224 of the full-length flexible insole 202 by the generally uniform thickness of the full-length flexible insole 202. In still further embodiments, the entirety of the heel cap 200 (including the plurality of engagement features 248) may be located within a reference boundary that is offset from the lower contoured surface 224 of the full-length flexible insole 202 by one and one-half times the thickness T of the full-length flexible insole 202. Accordingly, it will be appreciated that the shape of the heel cap 200, with and without the engagement features 248, may closely track and/or conform to the shape of the full-length flexible insole 202 at the areas of contact therebetween to provide a particularly sleek, low profile insole assembly 204.

According to some embodiments, including the example embodiment of the insole assembly 204 shown in FIGS. 9 and 10, apart from the series of intersecting ridges or other engagement features 248, the heel cap 200 may lack any other projections in the aft end 247 or heel region thereof, such as, for example, posts or other heel support or stiffening features. Further, in some embodiments, a rear heel portion of the upper contoured surface 242 of the heel cap 200 may be rounded and concave to assist in cupping a heel of a user, and a corresponding heel portion of the lower contoured surface 244 at the aft end 247 of the heel cap 200 may mimic the upper contoured surface 242 such that an entirety of the corresponding heel portion of the lower contoured surface 244 is similarly rounded and concave. Again, it will be appreciated that in some instances the shape of the heel cap 200 will closely track and/or conform to the shape of the full-length flexible insole 202 at the areas of contact therebetween to provide a particularly sleek, low profile insole assembly 204.

According to the example embodiment of the insole assembly 204 of FIGS. 9 and 10, at least the forefoot portion 228 of the full-length flexible insole 202 may include a beveled edge region 230 extending along a periphery 232 thereof. The beveled edge region 230 may taper toward a point at the upper contoured surface 222 of the full-length flexible insole 202 such that a thickness of the insole base increases with increasing distance inwardly away from an outer edge 234 of the forefoot portion 228 to a generally uniform thickness of the full-length flexible insole 202. Advantageously, the beveled edge region 230 may assist in enabling the insole assembly 204 to fit within a greater variety of footwear, including ski boots. In addition, the beveled edge region 230 can provide an area at the perimeter of the insole assembly 204 that may be relatively easier to trim to assist in modifying the insole assembly 204 to fit within various shoes or other footwear that may be relatively narrow or otherwise shaped in a manner that does not closely track that of the unmodified insole assembly 204.

Again, although methods are described with reference in particular to making a custom insole including a rigid heel cap 200 and a full-length flexible insole 202 (such as the insole assembly 204 shown in FIGS. 9 and 10), it will be appreciated that many aspects of the methods can be applied to a wide variety of footwear inserts including three-quarter length orthotics consisting of a unitary structure of rigid material.

Moreover, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ aspects, features and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An apparatus to assist in customizing a footwear insert to a plantar surface of an individual's foot, the apparatus comprising:
   a portable housing having a front face, the portable housing being engageable with a ground surface, and the front face including a foot receiving area that is substantially transverse to the ground surface;
   a heater unit disposed in the portable housing, the heater unit having an opening formed in the portable housing, the opening being sized to receive a footwear insert to selectively heat the footwear insert;
   a cradle for a distal end portion of a leg of an individual, the cradle extending outwardly from the front face of the portable housing; and
   a vent disposed in the portable housing, the vent being thermally coupled to the heater unit to vent heated air generated by the heater unit.

2. The apparatus of claim 1, further comprising a vacuum system that includes a vacuum unit disposed in the enclosure of the portable housing, the vacuum system including a bag and a control device to selectively apply a vacuum to the bag, the bag being positionable around the individual's foot and the footwear insert to bring the footwear insert into conformance with a plantar surface of a foot of the individual.

3. The apparatus of claim 1, wherein the cradle is adjustably movable toward and away from the foot receiving area.

4. The apparatus of claim 1, further comprising a support device disposed at the front face of the portable housing, the support device being adjustably positionable to selectively underlie and stabilize a metatarsal head of a foot of the individual.

5. The apparatus of claim 4, wherein the support device is shaped to underlie and stabilize the metatarsal head of the foot of the individual without interfering or contacting the footwear insert as the footwear insert is brought into conformance with a plantar surface of the foot of the individual.

6. The apparatus of claim 5, wherein the support device is adjustably movable back and forth in a direction that is parallel to a reference plane defined by the foot receiving area, the support device being rotatably adjustable about an axis that is perpendicular to the reference plane to enable adjustment of the support device to accommodate feet of different sizes.

7. The apparatus of claim 5, wherein the support device is shaped to underlie and stabilize the foot of the individual beneath only a fifth metatarsal head area of the foot of the individual.

8. The apparatus of claim 1, further comprising a laser device and an associated control to selectively generate one or more visible alignment indicators on a foot of the individual and the distal end portion of the leg of the individual to assist in positioning and orientating the foot of the individual in the foot receiving area.

9. The apparatus of claim 1, further comprising:
   a support device adjustably positionable in the foot receiving area to selectively underlie and stabilize a metatarsal head of a foot of the individual while the distal end portion of the leg of the individual is supported by the cradle; and
   a laser device and associated control positioned to selectively generate one or more visible alignment indicators on the foot of the individual and the distal end portion of the leg of the individual to assist in positioning and orientating the foot of the individual in the foot receiving area.

10. The apparatus of claim 1, further comprising:
an arrangement of wheels extending from the portable housing to engage the ground surface; and
a handle coupled to the portable housing, the handle enabling angular adjustments of the housing relative to the individual by guiding a tail end of the portable housing over the ground surface with assistance of the arrangement of wheels.

11. The apparatus of claim 1, wherein the portable housing includes a door to provide selective access to at least a portion of the heater unit.

12. The apparatus of claim 1, wherein the vent is configured to vent the heated air in a direction away from the foot receiving area.

13. A method of customizing a footwear insert, the method comprising:
inserting a footwear insert into a heater unit through an opening in a portable housing, the portable housing having a front face, the portable housing being engageable with a ground surface, the front face including a foot receiving area that is substantially transverse to the ground surface, the heater unit being disposed in the portable housing, the opening being sized to receive the footwear insert, the portable housing having a cradle that extends outwardly from the front face, the portable housing having a vent that is thermally coupled to the heater unit to vent heated air generated by the heater unit;
heating the footwear insert with the heater unit to increase pliability of the footwear insert;
cradling a distal end portion of a leg of an individual with the cradle to provide a desired position and orientation of a foot of the individual relative to the foot receiving area of the front face;
positioning the footwear insert on a plantar surface of the foot of the individual while the footwear insert remains in an increased-pliability condition and the cradle cradles the distal end portion of the leg of the individual; and
forming the footwear insert into conformance with a plantar surface of the foot of the individual while the footwear insert remains in the increased-pliability condition and the cradle cradles the distal end portion leg of the individual to form customize the footwear insert.

14. The method of claim 13, wherein forming the footwear insert into conformance with the plantar surface of the foot of the individual includes urging the footwear insert into conformance with the plantar surface of the foot of the individual with a vacuum system disposed in the portable housing.

15. The method of claim 13, wherein the cradle is movably coupled to the portable housing to move back and forth toward and away from the foot receiving area, and cradling the distal end portion of the leg of the individual comprises moving the cradle toward or away from the foot receiving housing based on a size of the foot of the individual or a size of the leg of the individual.

16. The method of claim 13, further comprising adjusting a support device that is movably coupled to the portable housing to underlie and stabilize a metatarsal head of the foot of the individual.

17. The method of claim 13, further comprising adjusting a support device that is movably coupled to the portable housing to underlie and stabilize the foot of the individual beneath only a fifth metatarsal head area of the foot of the individual.

18. The method of claim 13, further comprising adjusting a position or an orientation of the foot of the individual or the distal end portion of the leg of the individual to the foot receiving area such that a visible alignment indicator associated with the portable housing is aligned with one or more target locations on the foot of the individual or the distal end portion of the leg of the individual.

19. The method of claim 13, further comprising positioning and orientating the foot of the individual such that a midtarsal joint of the foot of the individual is in a locked or semi-locked position and a subtalar joint of the foot of the individual is in a neutral position.

* * * * *